(12) United States Patent
Aramaki et al.

(10) Patent No.: US 7,491,763 B2
(45) Date of Patent: Feb. 17, 2009

(54) POLYAMIDE COMPOSITION

(75) Inventors: Masaaki Aramaki, Chiba (JP); Asami Ohashi, Chiba (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 439 days.

(21) Appl. No.: 10/520,629

(22) PCT Filed: Jul. 9, 2003

(86) PCT No.: PCT/JP03/08813

§ 371 (c)(1),
(2), (4) Date: Dec. 30, 2005

(87) PCT Pub. No.: WO2004/007614

PCT Pub. Date: Jan. 22, 2004

(65) Prior Publication Data

US 2006/0142443 A1    Jun. 29, 2006

(30) Foreign Application Priority Data

Jul. 10, 2002    (JP) .............................. 2002-201249

(51) Int. Cl.
*C08K 3/22*    (2006.01)
(52) U.S. Cl. ..................... 524/437; 524/127; 524/128; 524/140; 524/141; 524/147; 524/150; 524/151; 524/152; 524/153; 524/414; 524/416; 524/417
(58) Field of Classification Search ................. 524/127, 524/128, 140, 141, 147, 150–153, 414, 416, 524/417, 437
See application file for complete search history.

(56) References Cited

U.S. PATENT DOCUMENTS

| | | | | |
|---|---|---|---|---|
| 4,031,060 | A | * | 6/1977 | Hackert ...................... 524/845 |
| 4,397,979 | A | * | 8/1983 | Reimschuessel ............ 524/413 |
| 5,821,177 | A | * | 10/1998 | Elgarhy ...................... 442/93 |
| 2002/0019497 | A1 | | 2/2002 | Mawatari et al. |
| 2003/0004248 | A1 | * | 1/2003 | Wakamura et al. .......... 524/441 |

FOREIGN PATENT DOCUMENTS

| | | |
|---|---|---|
| DE | 1 808 130 | 6/1969 |
| EP | 1 162 236 | 12/2001 |
| EP | 1 454 960 | 9/2004 |
| GB | 1 253 062 | 11/1971 |
| JP | 49-116151 | 11/1974 |
| JP | 9-512839 | 12/1997 |
| WO | WO94/19394 | 9/1994 |
| WO | WO95/22577 | 8/1995 |
| WO | WO 99/13006 | 3/1999 |

OTHER PUBLICATIONS

German Patent Office Action issued in corresponding German Patent Application No. 103 92 906.1-43.

* cited by examiner

*Primary Examiner*—Peter Szekely
(74) *Attorney, Agent, or Firm*—Staas & Halsey LLP

(57) ABSTRACT

A polyamide composition has (a) a polyamide, (b) at least one phosphorus compound selected from the group consisting of phosphoric acids, phosphorous acids, hypophosphorous acids, metal phosphates, metal phosphites, metal hypophosphites, phosphoric esters, and phosphorous esters, and (c) a soluble metal aluminate compound represented by the general formula $(M_2O)_x(Al_2O_3)_y$ (wherein $X+Y=1$ and M is a Group 1 metal of the Periodic Table), wherein the molar ratio of polyvalent metal to monovalent metal in the composition (polyvalent metal/monovalent metal) is from 0.25 to 1.0.

14 Claims, No Drawings

POLYAMIDE COMPOSITION

CROSS REFERENCE TO RELATED APPLICATIONS

The present application is based on Japanese Patent Application No. 2002-201249 filed on Jul. 10, 2002, and the contents are incorporated herein by reference.

BACKGROUND OF THE INVENTION

The present invention relates to a polyamide composition, which is excellent in thermal stability and is suitable for industrial materials such as various mechanical parts and electric/electronic parts, and a process for producing the same.

When a polyamide resin undergoes various heat histories, thermal degradation and oxidative degradation occur to result in increase of yellowness, change in molecular weight, and decrease in mechanical properties such as toughness and durability. The various heat histories occur because of polymerization, melt-kneading, molding (injection, extrusion, blowing, fiber-spinning, film formation, etc.), use in a high temperature environment, and the like. For the purpose of reducing the degree of degradation during the heat histories, a method of blending a phosphorus compound acting as a heat stabilizer with a polyamide composition is well known and frequently used. On the other hand, it is also well known that the phosphorus compound acts as a polymerization catalyst for polyamide resins. Therefore, a method of increasing the molecular weight and inhibiting increase in yellowness by blending a phosphorus compound such as sodium hypophosphite in a polymerization process for polyamide resins is a well-known technology in the art. However, a polyamide resin blended with only a phosphorus compound not only exhibits insufficient effect of inhibiting increase in yellowness but also induces a large change in the molecular weight at every heat history, particularly melt-kneading or a heat melt step during molding. These problems occur because the catalytic action of the phosphorus compound still remains. Yellowing and/or large changes in molecular weight cause problems such as decreased productivity, defective products, and the like.

As methods for solving these problems, methods of using a phosphorus compound and another metal compound in combination are disclosed in Japanese Patent No. 2741795 and JP 9-512839 T. More specifically, Japanese Patent No. 2741795 discloses a production process wherein a phosphorus compound such as sodium hypophosphite and a Group 1 base such as sodium bicarbonate are blended with a polyamide-forming reactant (starting material) and then polymerization is conducted or they are added to a polyamide in a melted state. The Group 1 base in the publication is selected from hydroxides, oxides, carbonates, alkoxides, bicarbonates, and hydrides. Moreover, JP 9-512839 T discloses a method wherein a phosphorus compound such as sodium hypophosphite and a polyvalent metal compound such as calcium acetate are blended with a polyamide-forming reactant (starting material) and then polymerization is conducted or they are added to a polyamide in a melted state. The polyvalent metal compound in the publication is selected from halides, nitrate salts, and carboxylate salts (i.e., acetate salts, propionate salts, benzoate salts, stearate salts, and the like) of Group 2 metals, zinc, and aluminum. It is disclosed that the polyamide resins obtained by these two production methods inhibit increase in yellowness even after storage for a long period of time and repeated melting operations during molding and extrusion as compared with conventional polyamide resins. Moreover, it is also described that change in molecular weight during the repeated melting operations is inhibited based on decrease in solid-phase polymerization rate. However, from the investigation by the present inventors, it has been found that, even when these methods are employed, if melting operations are repeated, then not only the effect of inhibiting increase in yellowness and the effect of inhibiting change in molecular weight are insufficient but also mechanical properties, such as toughness, is not well satisfactory.

On the other hand, JP 47-39156 A, JP 49-116151 A, and JP 1-104652 A disclose polyamide resins with which a soluble aluminate such as sodium aluminate is blended. Even when only a metal aluminate is blended with a polyamide-forming component (starting material) and then polymerization is conducted according to the technology, a prolonged polymerization time is required for obtaining a desired molecular weight owing to decrease in polymerization rate and, as a result, increase in yellowness and decrease in mechanical properties such as toughness are induced. Moreover, even when a metal aluminate is blended with a polyamide by melt-kneading, the molecular weight of the resulting polyamide resin tends to decrease and, as a result, the polyamide has insufficient mechanical properties such as toughness.

The present invention relates to a polyamide composition excellent in thermal stability, which is suitable for industrial materials such as various mechanical parts and electric/electronic parts, and a process for producing the same. More precisely, it relates to a polyamide composition which, even after a prolonged heat history or repeated heat histories, is inhibited from increasing in yellowness, is inhibited from suffering thermal decomposition, has a stable melt viscosity, and is excellent in mechanical properties such as toughness, as compared with conventional polyamide resins.

SUMMARY OF THE INVENTION

As a result of the extensive studies for solving the foregoing problems addressed in the invention, the inventors of the present invention have found that the above problems can be solved by a polyamide composition which contains a phosphorus compound such as a metal salt of phosphoric acid, phosphorous acid, or hypophosphorous acid and a soluble metal aluminate and which has a specific range of the ratio of polyvalent metal to monovalent metal. In particular, they have found that the improvements are more remarkable in a polyamide obtained by blending a phosphorus compound such as a metal salt of phosphoric acid, phosphorous acid, or hypophosphorous acid and a soluble metal aluminate with a polyamide-forming component or a polyamide during a step of polymerization so that the ratio of polyvalent metal to monovalent metal falls within a specific range. Thus, they have accomplished the invention.

Namely, the invention relates to:

(1) A polyamide composition comprising (a) a polyamide, (b) at least one phosphorus compound selected from the group consisting of phosphoric acids, phosphorous acids, hypophosphorous acids, metal phosphates, metal phosphites, metal hypophosphites, phosphoric esters, and phosphorous esters, and (c) a soluble metal aluminate represented by the general formula $(M_2O)_x(Al_2O_3)_y$ (wherein $X+Y=1$ and M is a Group 1 metal of the Periodic Table), wherein the molar ratio of polyvalent metal to monovalent metal in the composition (polyvalent metal/monovalent metal) is from 0.25 to 1.0;

(2) The polyamide composition according to the above (1), wherein the phosphorus compound (b) is at least one compound selected from salts of phosphoric acid, phosphorous acid or hypophosphorous acid with Group 1 metals of the Periodic Table;

(3) The polyamide composition according to the above (1), wherein the soluble metal aluminate (c) is a sodium aluminate represented by the general formula $(Na_2O)_x(Al_2O_3)_y$, (wherein X+Y=1 and $0.35 \leq Y/X \leq 1.25$);

(4) The polyamide composition according to any one of the above (1) to (3), wherein the polyamide composition contains 0.10 to 10 mol of phosphorus element, 0.10 to 10 mol of the polyvalent metal, and 0.10 to 10 mol of the monovalent metal per 1,000,000 g of polyamide;

(5) A process for producing a polyamide composition comprising a step of blending (a') at least one of a polyamide-forming component, a polyamide during polymerization, and a melted polyamide with (b) at least one phosphorus compound selected from the group consisting of phosphoric acids, phosphorous acids, hypophosphorous acids, metal phosphates, metal phosphites, metal hypophosphites, phosphoric esters, and phosphorous esters and (c) a soluble metal aluminate represented by the general formula $(M_2O)_x (Al_2O_3)_y$, (wherein X+Y=1 and M is a Group 1 metal of the Periodic Table), wherein the components (b) and (c) are blended so that the molar ratio of polyvalent metal to monovalent metal (polyvalent metal/monovalent metal) becomes from 0.25 to 1.0.;

(6) The process for producing the polyamide composition according to the above (5), wherein both of the phosphorus compound (b) and the soluble metal aluminate (c) are mixed with the polyamide-forming components and then polymerization is conducted;

(7) The process for producing the polyamide composition according to the above (5), wherein the phosphorus compound (b) is blended with the polyamide-forming component, followed by conducting polymerization, and (c) the soluble metal aluminate is blended with the polyamide during polymerization;

(8) The process for producing the polyamide composition according to the above (5), wherein the soluble metal aluminate (c) is dissolved in water and then blended in the form of an aqueous solution having a pH exceeding 9;

(9) The process for producing the polyamide composition according to the above (5), wherein the phosphorus compound (b) is at least one compound selected from salts of phosphorous acid or hypophosphorous acid with Group 1 metals of the Periodic Table;

(10) The process for producing the polyamide composition according to the above (5), wherein the soluble metal aluminate (c) is sodium aluminate represented by the general formula $(Na_2O)_x(Al_2O_3)_y$, (wherein X+Y=1 and $0.35 \leq Y/X \leq 1.25$);

(11) The process for producing the polyamide composition according to the above (5), wherein the phosphorus compound (b) and the soluble metal aluminate (c) are blended so that 0.10 to 10 mol of phosphorus element, 0.10 to 10 mol of polyvalent metal, and 0.10 to 10 mol of monovalent metal per 1,000,000 g of polyamide are contained;

(12) The process for producing the polyamide composition according to the above (5) or (10), wherein the soluble metal aluminate (c) is $0.35 \leq Y/X < 1.0$ and the relationship with its molar mixing amount (Z') per 1,000,000 g of polyamide is Z'<1.785/(X−Y);

(13) The process for producing the polyamide composition according to the above (5) or (10), wherein the soluble metal aluminate (c) is $0.35 \leq Y/X < 1.0$ and the relationship with its molar mixing amount (Z') per 1,000,000 g of polyamide is Z'<1.785/X;

(14) A polyamide composition obtained by the production process according to any one of the above (5) to (13); and

(15) A polyamide composition comprising 100 parts by weight of the polyamide composition according to the above (1) or (14) and 0.001 to 1 part by weight of at least one moldability improving agent selected from higher fatty acids, metal salts of higher fatty acids, higher fatty acid amides, and higher fatty acid esters.

DETAILED DESCRIPTION OF THE INVENTION

The following will explain the invention in detail.

The component (a) of the invention; a polyamide is not particularly limited as far as a polymer having an amide bond (—NHCO—) in the main chain but a preferred polyamide for achieving the object of the invention is polyamide 6, polyamide 66, polyamide 610, polyamide 612, polyamide 6I, polyamide 6T, and a polyamide copolymer containing at least two different kinds of polyamide components thereof or a mixture thereof.

From the viewpoint of achieving the object of the invention, the molecular weight of the polyamide of the invention is preferably from 20 to 500, more preferably from 25 to 350, and most preferably from 30 to 300, in terms of relative viscosity (RV) as determined in accordance with ASTM D789. The relative viscosity (RV) is determined at a concentration of 3 g of sample/30 ml of formic acid under a temperature condition of 25° C. using 90% formic acid as a solvent.

The component (b) of the invention; a phosphorus compound is selected from phosphoric acid compounds, phosphorous acid compounds, and hypophosphorous acid compounds such as (1) phosphoric acids, phosphorous acids, and hypophosphorous acids, (2) metal phosphates, metal phosphites, and metal hypophosphites, and (3) phosphoric esters and phosphorous esters.

Examples of the above (1), i.e., phosphoric acids, phosphorous acids, and hypophosphorous acids include phosphoric acid, phosphorous acid, hypophosphorus acid, pyrophosphorous acid, diphosphorous acid, and the like.

Examples of the above (2), i.e., metal phosphates, metal phosphites, and metal hypophosphites include salts of the above (1) phosphorus compounds with Group 1 and Group 2 of the Periodic Table, manganese, zinc, aluminum, ammonia, an alkylamine, a cycloalkylamine, and a diamine.

The above (3), i.e., phosphoric esters and phosphorous esters is represented by the following general formulae:

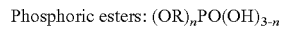
Phosphoric esters: $(OR)_n PO(OH)_{3-n}$

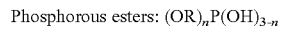
Phosphorous esters: $(OR)_n P(OH)_{3-n}$ wherein n represents 1, 2, or 3 and R represents an alkyl group, a phenyl group, or a substituted alkyl group, wherein part of these groups is substituted by a hydrocarbon group or the like. When n is 2 or more, a plurality of the (RO) groups in the above general formulae may be the same or different from one another.

The above R includes aliphatic groups such as a methyl group, an ethyl group, an n-propyl group, an n-butyl group, a t-butyl group, an n-hexyl group, a cyclohexyl group, an n-octyl group, a nonyl group, a decyl group, a stearyl group, and an oleyl group; aromatic groups such as a phenyl group and a biphenyl group; aromatic groups having a substituent such as a hydroxyl group, a methyl group, an ethyl group, a propyl group, a methoxy group, or an ethoxy group, and the like.

A preferred component (b) of the invention; a phosphorus compound is a metal salt of phosphoric acid, phosphorous acid, or hypophosphorous acid with a Group 1 metal of the Periodic Table, more preferred is a metal salt of phosphorous acid or hypophosphorous acid with a Group 1 metal of the Periodic Table, and most preferred is sodium hypophosphite (NaH$_2$PO$_2$) or a hydrate thereof (NaH$_2$PO$_2$.nH$_2$O).

The component (c) of the invention; a soluble aluminate is represented by the following formula:

$$(M_2O)_x(Al_2O_3)_y$$

wherein X+Y=1 and M is a Group 1 metal of the Periodic Table.

A preferred component (c) of the invention is sodium aluminate where a main component of M in the above general formula is sodium.

The molar ratio of aluminum (Al) to the Group 1 metal M of the Periodic Table, the value of Y/X is preferably 0.35≦Y/X≦1.25, more preferably 0.35≦Y/X<1.00, and most preferably 0.5≦Y/X≦0.87.

Moreover, the range of mol content (Z) of the component (c) per 1,000,000 g of polyamide is preferably Z<1.785/(X−Y), more preferably Z<1.785/X in terms of the relationship with Y/X. When the X, Y, and Y/X fall within the above range, there is a tendency that inhibitory effects on increase in yellowness and change in molecular weight by heat history, toughness, and the like can be better achieved.

In the invention, the molar ratio of polyvalent metal to monovalent metal (polyvalent metal/monovalent metal) is from 0.25 to 1.0, preferably from 0.30 to 0.9, more preferably from 0.30 to 0.75. The polyvalent metal and the monovalent metal mean metals other than Group 1 metals in the Periodic Table (Groups 2 to 13 elements of the Periodic Table, boron, aluminum, silica, tin, and lead), and Group 1 metals in the Periodic Table, respectively. Problems that inhibitory effects on increase in yellowness and change in the molecular weight are insufficient tend to occur when the molar ratio of polyvalent metal to monovalent metal (polyvalent metal/monovalent metal) is less than 0.25 and mechanical properties such as toughness are insufficient when it exceeds 1.0.

In the invention, the polyamide composition contains preferably 0.10 to 10 mol of phosphorus element, 0.10 to 10 mol of polyvalent metal, and 0.10 to 10 mol of monovalent metal, more preferably 0.20 to 5 mol of phosphorus element, 0.20 to 7.5 mol of polyvalent metal, and 0.20 to 7.5 mol of monovalent metal, per 1,000,000 g of polyamide. By setting each element in the above range, there is a tendency that inhibitory effects on increase in yellowness and change in molecular weight by heat history, toughness, and the like, which are objects of the invention, can be better achieved.

In the invention, the ratio of the sum of polyvalent metal and monovalent metal to the phosphorus (P) element, (polyvalent metal+monovalent metal)/P is preferably from more than 1 to 8 or less, more preferably from 2 to 7.5, and most preferably 3 to 7.5. By setting the ratio in the above range, there is a tendency that inhibitory effects on increase in yellowness and change in molecular weight by heat history, toughness, and the like, which are objects of the invention, can be better achieved.

The production process of the invention is a process for obtaining a polyamide composition comprising a step of blending (a') at least one of a polyamide-forming component, a polyamide during a step of polymerization, and a melted polyamide with the above phosphorus compound (b), and the above soluble metal aluminate (c) represented by the general formula (M$_2$O)$_x$(Al$_2$O$_3$)$_y$ (wherein X+Y=1 and M is a Group 1 metal of the Periodic Table). Particularly, a preferred process is a process wherein both of the phosphorus compound (b) and the soluble metal aluminate (c) are blended with the polyamide-forming component and then polymerization is conducted (Production method 1); and a process wherein the phosphorus compound (b) is blended with the polyamide-forming component and the soluble metal aluminate (c) is blended with the polyamide during polymerization (Production method 2).

In a more preferred process for production, the phosphorus compound (b) and the soluble metal aluminate (c) are blended as aqueous solutions. In particular, the soluble metal aluminate (c) is more preferably added in the form of an aqueous solution having a pH exceeding 9. When it is added in the form of an aqueous solution, there is a tendency that the soluble metal aluminate (c) is apt to be homogeneously mixed with the polyamide-forming component, the polyamide during polymerization, or the melted polyamide as compared with the case of the addition as a powder. Thereby, the object of the invention can be better achieved. For preparing an aqueous solution having a pH exceeding 9, the soluble aluminate may be directly dissolved in water or the aluminate may be dissolved after an aqueous solution containing an alkali component, preferably an alkali component such as a diamine or a monoamine as a polyamide-forming component is prepared beforehand. When an aqueous solution having a pH of 9 or lower is used, sometimes problems arise including decrease in solubility, occurrence of precipitation of insoluble substances, and the like, and the aluminate is inhomogeneously dispersed in the resulting polyamide composition and thus aimed effects are sometimes not obtained.

The polyamide-forming component (a') in the production process of the invention are not particularly limited as far as it is a well-known forming component used for producing a polymer having an amide bond (—NHCO—) in the main chain. Examples thereof include polymerizable amino acids, polymerizable lactams, salts or mixtures of polymerizable diamines and dicarboxylic acids, and polymerizable oligomers. A preferred polyamide-forming component for achieving the object of the invention is a polyamide-forming component for producing polyamide 6, polyamide 66, polyamide 610, polyamide 612, polyamide 6I, polyamide 6T, and a polyamide copolymer containing at least two different kinds of polyamide components thereof.

Moreover, the above polyamide (a') during polymerization is a polyamide during a step of polymerization for obtaining a polyamide having a desired molecular weight using a polymerization apparatus for polyamide well-known in the art. Furthermore, the above melted polyamide (a') is a polyamide melted at melt-kneading, molding, or the like.

In the production process of the invention, the phosphorus compound (b) and the soluble metal aluminate (c) are blended so that the molar ratio of polyvalent metal to monovalent metal (polyvalent metal/monovalent metal) becomes from 0.25 to 1.0, preferably from 0.30 to 0.9, more preferably from 0.30 to 0.75. There is a tendency to cause problems that inhibitory effects on increase in yellowness and change in molecular weight are insufficient when the molar ratio of polyvalent metal to monovalent metal (polyvalent metal/monovalent metal) is less than 0.25 and mechanical properties such as toughness are insufficient when it exceeds 1.0.

In the production process of the invention, the phosphorus compound (b) and the soluble metal aluminate (c) are preferably blended so that 0.10 to 10 mol of phosphorus element, 0.10 to 10 mol of polyvalent metal, and 0.10 to 10 mol of monovalent metal per 1,000,000 g of polyamide are contained. More preferably, the phosphorus compound (b) and the soluble metal aluminate (c) are blended so that 0.20 to 5 mol of phosphorus element, 0.20 to 7.5 mol of polyvalent metal, and 0.20 to 7.5 mol of monovalent metal are contained.

By setting each element in the above range, there is a tendency that inhibitory effects on increase in yellowness and change in molecular weight by heat history, toughness, and the like can be better achieved, which is an object of the invention.

The component (b) of the invention; a phosphorus compound is as mentioned above. A preferred phosphorus compound in the production process is a metal salt of phosphorous acid or hypophosphorous acid with a Group 1 metal of the Periodic Table and more preferred is sodium hypophosphite ($NaH_2PO_2$) or a hydrate thereof ($NaH_2PO_2 \cdot nH_2O$).

The component (c) of the invention; a soluble metal aluminate is as mentioned above. Moreover, the molar ratio of aluminum (Al) to the Group 1 metal of the Periodic Table in the general formula, the value of Y/X is preferably $0.35 \leq Y/X \leq 1.25$, more preferably $0.35 \leq Y/X < 1.00$, and most preferably $0.5 \leq Y/X \leq 0.87$.

Furthermore, the range of mol content (Z') of the component (c) per 1,000,000 g of polyamide is preferably $Z < 1.785/(X-Y)$, more preferably $Z < 1.785/X$ in terms of the relationship with Y/X. When the X, Y, and Y/X fall within the above range, there is a tendency that inhibitory effects on increase in yellowness and change in molecular weight by heat history, toughness, and the like can be better achieved.

In the production process of the invention, the ratio of the sum of polyvalent metal and monovalent metal to the phosphorus (P) element, (polyvalent metal+monovalent metal)/P in terms of a molar ratio is preferably from more than 1 to 8 or less, more preferably from 2 to 7.5, and most preferably 3 to 7.5. By setting the ratio in the above range, there is a tendency that inhibitory effects on increase in yellowness and change in molecular weight by heat history, toughness, and the like, which are objects of the invention, can be better achieved.

As polymerization processes for the above polyamide, well-known processes can be employed. For example, use can be made of a ring-opening polycondensation process using a lactam such as ε-caprolactam as the polyamide-forming component, a heat-melt process using a diamine-dicarboxylate salt such as hexamethyleneadipamide or a mixture thereof as the forming component, and the like process. In addition, a solid-phase polymerization process carried out at a temperature not higher than the melting point of a solid salt of the polyamide-forming component or the polyamide, a solution process using a dicarboxylic acid halide component and a diamine component component, and the like process can be also employed. These processes may be used in combination, if necessary. Of these, the heat-melt process and a combined process of the heat-melt process and the solid-phase polymerization process are most efficient.

Moreover, a reaction mode may be either a batch-wise or continuous manner. Also, the polymerization apparatus is not particularly limited and a known apparatus, e.g., an autoclave-type reactor, a tumbler reactor, an extruder-type reactor such as a kneader, or the like can be used.

The heat-melt process, which is a preferred polymerization process of the invention, will be more specifically described. In the batch-wise process, an about 40 to 60% by weight liquid containing a polyamide-forming component in water as a solvent is first concentrated to a concentration of about 65 to 85% by weight in a concentration vessel operated at a temperature of 120 to 160° C. and a pressure of about 0.035 to 0.5 MPa. Then, the concentrated solution is transferred to an autoclave and the whole is continuously heated until the pressure in the vessel reaches about 1.5 to 3.0 MPa. Thereafter, the pressure is maintained at about 1.5 to 3.0 MPa with releasing water or gaseous components and, at the time when the temperature reaches about 250 to 320° C., the pressure is lowered to atmospheric pressure and then, if necessary, is further reduced. Thereafter, the pressure is elevated with an inert gas such as nitrogen and the polyamide is extruded to form a strand, which is then transformed to pellets after cooling and cutting. The continuous polymerization is also well known in the art. More specifically, an about 40 to 60% by weight liquid containing an polyamide-forming component using water as a solvent is pre-heated to about 40 to 100° C. in the vessel of a pre-heating apparatus, and then transferred to a concentration layer/reactor, where the liquid is concentrated to a concentration of about 70 to 90% by weight at a pressure of about 0.1 to 0.5 MPa and a temperature of about 200 to 270° C. Then, the concentrate is discharged into a flasher maintained at a temperature of about 200 to 320° C. and the pressure is slowly lowered to atmospheric pressure. After the pressure is lowered to atmospheric pressure, polymerization is completed by reducing the pressure, if necessary. Then, the polyamide melted product is extruded to form a strand, which is subsequently cooled and cut into pellets.

In the case of using the above melt-kneading process, a kneader commonly put into a practical use can be employed as an apparatus for the melt-kneading. For example, a single-screw or multi-screw kneading extruder, a roll, a Banbury mixer, and the like may be preferably used. In particular, most preferred is a twin-screw extruder equipped with a pressure-reducing apparatus and a side-feeder apparatus. Examples of methods of melt-kneading include kneading all the components at once; kneading a blend pre-kneaded beforehand; or feeding respective components successively in the mid flow of an extruder and kneading them.

As the above molding, well-known molding methods can be cited, which include press molding, injection molding, gas assisted injection molding, welding, extrusion, blow molding, film forming, hollow molding, multi-layer molding, melt spinning, and the like.

Into the polyamide resin composition of the invention, additives conventionally employed for polyamides may be incorporated within an extent not impairing the object of the invention, the additives being, for example, pigments and dyes; moldability improving agents such as higher fatty acids, higher fatty acid metal salts, higher fatty acid amides, and higher fatty acid esters; organic antioxidants, e.g., compounds such as hindered phenols, organophosphorus, and hindered amines; lubricants; plasticizers; flame retardants; heat stabilizers such as copper acetate, copper iodide, and potassium iodide; UV absorbers; fluorescent bleaching agents; nucleus agents; rubbers; and reinforcing agents such as glass short fibers and mineral fillers.

A preferred moldability improving agent of the invention is at least one compound selected from higher fatty acids such as stearic acid and erucic acid; higher fatty acid metal salts such as calcium stearate and aluminum stearate; higher fatty acid amides such as erucic acid amides, ethylene-bis-stearylamide, and N-stearylercamide; and higher fatty acid esters such as stearyl stearate; and the like. The content of the moldability improving agent is preferably from 0.001 to 1 part by weight, more preferably from 0.01 to 0.5 part by weight relative to 100 parts by weight of the polyamide composition. When the content is out of the above range, sometimes problems arise including insufficient improvement in moldability such as plasticizing ability and releasing ability, deterioration in toughness, and the like.

The mixing method of the above additives is not particularly limited. For example, the additives can be mixed with the polyamide-forming component, can be mixed with the polyamide during polymerization, can be mixed with the polyamide during melt-kneading or molding, etc., as mentioned above. In addition, a method of blending or coating pellets of the polyamide composition therewith can be also employed. These methods may be used in combination. The method of coating with the additives is not particularly limited. Preferred apparatuses for coating include those equipped with a device for spraying the additives in a liquid state with any of various solvents or in a melted state onto a Henschel mixer, a horizontal chamber-type mixer equipped with spade-shape shovel blades (e.g., Proshare mixer (batchwise or continuous manner) manufactured by Pacific Machinery & Engineering Co., Ltd.), a continuous mixer through a rotating mixing plate (e.g., a flow jet mixer manufactured by Funken Powtechs, Inc.) or a mixer equipped with a screw rotating on its axis and revolving along the inner wall of a conical casing (e.g., a Nauta mixer manufactured by Hosokawa Micron Corporation).

The polyamide composition of the invention is inhibited from increasing in yellowness, is inhibited from suffering thermal decomposition, and is excellent in mechanical properties such as toughness, so that it is useful in various molding applications such as automobile parts, industrial application parts, electronic parts, and gears and extrusion applications such as tubes, rods, filaments, films, and blow molded articles.

EXAMPLES

The present invention will be illustrated in greater detail with reference to the following Examples, but the invention should not be construed as being limited thereto unless it exceeds its gist. The evaluation of the physical properties described in the following Examples and Reference Examples were conducted as follows.

1. Characteristics of Polyamide Resins (1) Metal Analysis

For quantitative determination of phosphorus, 0.5 g of a polyamide composition was weighed and 20 ml of concentrated sulfuric acid was added thereto, followed by wet decomposition on a heater. After cooling, 5 ml of hydrogen peroxide was added and the resulting mixture was heated on the heater to concentrate the whole amount to 2 to 3 ml. The concentrate was again cooled and then the volume was made 500 ml with pure water. The quantitative determination was conducted at a wavelength of 213.618 (nm) by an inductively coupled plasma (ICP) emission spectrometry using "IRIS/IP" manufactured by Thermo Jarrell Ash as an apparatus. The other metal elements were also quantitatively determined at respective characteristic wavelengths similarly.

(2) Relative Viscosity (RV)

Using 90% formic acid as a solvent, the measurement was conducted under conditions of a concentration of 3 g of sample/30 ml of formic acid and a temperature of 25° C. Pellets and molded articles were measured.

(3) Yellowness

Using a color-difference meter ND-300A manufactured by Nippon Denshoku, a "b value" was measured by refractive measurement and yellowness was evaluated.

(4) Change of Relative Viscosity (RV) by Staying Under Heat

Each pellet was vacuum-dried at 80° C. for 24 hours. Using an injection molding machine (PS-40E manufactured by Nissei Plastic Industrial Co., Ltd.), a cylinder temperature was set at 320° C. and a mold temperature at 80° C., and each pellet were allowed to stay therein for 30 minutes. Thereafter, RV of the molded article obtained by injection was measured. A difference between PV of the molded article and RV of the pellet, $\Delta RV = RV(pellet) - RV(molded\ article)$, was calculated to evaluate change in molecular weight.

(5) Tensile Properties on Thin-Wall Molded Article

Using an injection molding machine (PS-40E manufactured by Nissei Plastic Industrial Co., Ltd.), a cylinder temperature was set at 320° C. and a mold temperature at 80° C. A test piece for evaluation having a thickness of 2 mm was obtained under injection molding conditions of injection for 8 seconds and cooling for 13 seconds. Thereafter, tensile strength and tensile elongation were measured in accordance with ASTM D638.

(6) Thermal Aging Properties

In a similar manner to the above (5), a cylinder temperature was set at 280° C. and a mold temperature at 80° C. to mold a tensile test piece having a thickness of 3 mm. The test piece was placed in an oven set at 120° C. and heated. Using the test piece, a tensile test was conducted in accordance with ASTM D638 to determine the number of days until the tensile strength reduced from the initial value to the half.

(7) Yellowness after Thermal Aging

In a similar manner to the above (5), a cylinder temperature was set at 280° C. and a mold temperature at 80° C. to mold a flat test piece. The test piece was placed in an oven set at 120° C. and heated for 3 days. The b value of the test piece after 3 days was measured to evaluate yellowness.

(8) Generation of Thermal Decomposition Product (MD) During Molding

Using an injection molding machine (CN75 manufactured by Niigata Tekko) and an MD mold, a cylinder temperature was set at 290° C. and a mold temperature at 40° C. Molding was conducted under injection molding conditions of injection for 3 seconds and cooling for 7 seconds. Molding of 1000 shots was conducted and MD attached to the mold was visually investigated every 250 shots.

A: MD is hardly generated.

B: MD is slightly generated.

C: MD is generated in a large amount.

(9) Amount of Gaseous Components by Thermal Decomposition (% by Weight)

Ten mg of a sample was set at a TG-DTA apparatus (Rigaku Denki, Thermo Plus2 TG8120) and was measured in a nitrogen atmosphere where nitrogen was passed through the oven at a rate of 30 ml/minute. The temperature was elevated from room temperature to 280° C. at a rate of 100° C./minute and maintained at 280° C. for 60 minutes. The weight before heating and the weight after maintenance at 280° C. for 60 minutes were measured and the amount of gaseous components was determined in accordance with the following formula:

Amount of gaseous components (% by weight)=$(W_0 - W_1) \times 100/W_0$

(10) Mold-Releasing Ability (Kgf)

Using a mold fitted with a mold-releasing force measuring apparatus where a load cell was provided on an ejector pin for molded articles, molding was conducted under the following molding conditions. Mold-releasing force was measured at every 50 shots and an average value was calculated. It is meant that the lower the mold-releasing force is, the more excellent the moldability is.

Injection molding machine: FN3000 manufactured by Nissei Plastic Engineering Co., Ltd.

Mold: Cup-shape molded article

Cylinder temperature: 320° C.

Mold temperature: 30° C.

Injection pressure: 40 Mpa

(11) Plasticity (sec)

Molding was conducted as in the same manner as used to evaluate the mold-releasing performance in (10) above. The time required for the screw to step back upon plasticization was measured and an average value of plasticization time for 50 shots was determined.

Injection time: 7 seconds
Cooling time: 20 seconds

Example 1

(Batch-wise process) As a polyamide-forming component, 1600 kg of a polyamide 66-forming component (an equimolar salt of hexamethylenediamine and adipic acid) was used. With a 50% by weight aqueous solution containing the forming component were blended 828 g of acetic acid and 828 g of hexamethylenediamine as end-blocking agents. Furthermore, 726 g of a 38% by weight aqueous solution of sodium aluminate ($(Na_2O)_x(Al_2O_3)_y$, (X+Y=1 and Y/X=0.59)), 1380 g of a 10% by weight aqueous solution of sodium hypophosphite ($NaH_2PO_2$), and 55 g of a silicone-based defoaming agent were blended therewith and the blend was charged into a concentration vessel, followed by mixing under a temperature condition of about 50° C. and replacement with nitrogen. Then, the temperature was elevated from about 50° C. to about 150° C. At this time, heating was continued to concentrate the blend to about 80% while water was removed to outside of the system in order to maintain the pressure in the concentration vessel at about 0.05 to 0.15 MPa as a gauge pressure. The concentrated solution was transferred to an autoclave and the temperature was elevated from 150° C. to about 220° C. to increase the pressure to about 1.77 MPa as a gauge pressure. Thereafter, the temperature was elevated from about 220° C. to about 260° C. and the heating was conducted while water was removed to outside of the system so as to maintain the pressure at about 1.77 MPa. Finally, the pressure was gradually lowered to atmospheric pressure while the temperature was elevated to about 280° C. The product was discharged under pressurization with nitrogen from the lower-part nozzle in the strand form and then water-cooling and cutting were conducted to discharge it in the pellet form. The resulting pellets were dried in a nitrogen stream for 60 minutes under a condition of 150° C. to obtain a polyamide composition. The relative viscosity (RV) of the polyamide composition was found to be 48. Moreover, a water content measured by the Karl Fischer's method was found to be 0.10% by weight. The evaluation results are shown in Table 1.

Example 2

(Batch-wise process) This example was conducted in the same manner as in Example 1. However, 1452 g of the aqueous solution of sodium aluminate and 2760 g of the aqueous solution of sodium hypophosphite were used. The evaluation results are shown in Table 1.

Example 3

(Batch-wise process) Sodium aluminate ($(Na_2O)_x(Al_2O_3)_y$ (X+Y=1 and Y/X=0.81)) was dissolved in a 0.05% by weight aqueous solution (pH=10.5) of hexamethylenediamine so as to achieve a 10% by weight aqueous solution. Even when the aqueous solution was allowed to stand for about 1 day, no precipitation was observed. As a polyamide-forming component, 1600 kg of a polyamide 66-forming component (an equimolar salt of hexamethylenediamine and adipic acid) was used. With a 50% by weight aqueous solution containing the forming component were blended 828 g of acetic acid and 828 g of hexamethylenediamine as end-blocking agents. Furthermore, 2750 g of the above aqueous solution of sodium aluminate, 1380 g of a 10% by weight aqueous solution of sodium hypophosphite ($NaH_2PO_2$), and 55 g of a silicone-based defoaming agent were blended therewith and the blend was charged into a concentration vessel, followed by mixing under a temperature condition of about 50° C. and replacement with nitrogen. The subsequent operations were conducted in the same manner as in Example 1. The evaluation results are shown in Table 1.

Example 4

(Batch-wise process) As a polyamide-forming component, 1600 kg of a polyamide 66-forming component (an equimolar salt of hexamethylenediamine and adipic acid) was used. With a 50% by weight aqueous solution containing the forming component were blended 828 g of acetic acid and 828 g of hexamethylenediamine as end-blocking agents. Moreover, 550 g of powdery sodium aluminate ($(Na_2O)_x(Al_2O_3)_y$, (X+Y=1 and Y/X=0.81)), 1380 g of a 10% by weight aqueous solution of sodium hypophosphite ($NaH_2PO_2$), and 55 g of a silicone-based defoaming agent were blended therewith and the blend was charged into a concentration vessel, followed by mixing under a temperature condition of about 50° C. and replacement with nitrogen. The subsequent operations were conducted in the same manner as in Example 1. The evaluation results are shown in Table 1.

Example 5

(Batch-wise process) As a polyamide-forming component, 1600 kg of a polyamide 66-forming component (an equimolar salt of hexamethylenediamine and adipic acid) was used. With a 50% by weight aqueous solution containing the forming component were blended 828 9 of acetic acid and 828 g of hexamethylenediamine as end-blocking agents. Moreover, 69 g of powdery sodium aluminate ($(Na_2O)_x(Al_2O_3)_y$, (X+Y=1 and Y/X=0.81)), 1380 g of a 10% by weight aqueous solution of sodium hypophosphite ($NaH_2PO_2$), and 55 g of a silicone-based defoaming agent were blended therewith and the blend was charged into a concentration vessel, followed by mixing under a temperature condition of about 50° C. and replacement with nitrogen. The subsequent operations were conducted in the same manner as in Example 1. The evaluation results are shown in Table 1.

Example 6

(Continuous process) As a polyamide-forming component, a 50% by weight aqueous solution of a polyamide 66-forming component (an equimolar salt of hexamethylenediamine and adipic acid) was used. The aqueous solution was injected to a concentration layer/reactor at a rate of about 3,000 kg/hr and was concentrated to a concentration of about 90%. Then, the concentrate was discharged to a flasher and the pressure was gradually lowered to atmospheric pressure. It was transferred to a next vessel and maintained under conditions of a temperature of about 280° C. and a pressure not higher than atmospheric pressure. Then, the polyamide was extruded to form a strand, which was then cooled and cut into pellets, whereby a polyamide composition was obtained. In the continuous process polymerization, an aqueous solution of sodium hypophosphite and an aqueous solution of sodium aluminate ($(Na_2O)_x(Al_2O_3)_y$, (X+Y=1 and Y/X=0.59)) were blended with the aqueous solution of the polyamide-forming component. The amounts of sodium hypophosphite and sodium aluminate to be mixed were determined so as to be 41 ppm and 81 ppm relative to the polyamide-forming component, respectively. The relative viscosity (RV) of the resulting polyamide composition was found to be 50. Moreover, a water content measured by the Karl Fischer's method was found to be 0.10% by weight. The evaluation results are shown in Table 1.

Example 7

(Continuous process) This example was conducted in the same manner as in Example 5. However, the aqueous solution of sodium hypophosphite was blended with the aqueous solution of the polyamide-forming component. Moreover, the aqueous solution of sodium aluminate $((Na_2O)_x(Al_2O_3)_y, (X+Y=1 \text{ and } Y/X=0.59))$ was blended with the polyamide during a step of polymerization. The evaluation results are shown in Table 1.

Comparative Example 1

This example was conducted in the same manner as in Example 1. However, neither the aqueous solution of sodium aluminate nor the aqueous solution of sodium hypophosphite was blended. The evaluation results are shown in Table 2.

Comparative Example 2

This example was conducted in the same manner as in Example 1. However, the aqueous solution of sodium aluminate was not blended. The evaluation results are shown in Table 2.

Comparative Example 3

This example was conducted in accordance with Example 1 of JP 49-116151 A. As a polyamide-forming component, 1600 kg of a polyamide 66-forming component (an equimolar salt of hexamethylenediamine and adipic acid) was used. With a 50% by weight aqueous solution containing the forming component were blended 828 g of acetic acid and 828 g of hexamethylenediamine as end-blocking agents. Moreover, 1380 g of powdery sodium aluminate $((Na_2O)_x(Al_2O_3)_y, (X+Y=1 \text{ and } Y/X=1.00))$ and 55 g of a silicone-based defoaming agent were blended therewith and the blend was charged into a concentration vessel, followed by mixing under a temperature condition of about 50° C. and replacement with nitrogen. The subsequent operations were conducted in the same manner as in Example 1. The evaluation results are shown in Table 2.

Comparative Example 4

This example was conducted in accordance with Example 3 of JP 1-104652 A. As a polyamide-forming component, 1600 kg of a polyamide 66-forming component (an equimolar salt of hexamethylenediamine and adipic acid) was used. With a 50% by weight aqueous solution containing the forming component were blended 828 g of acetic acid and 828 g of hexamethylenediamine as end-blocking agents. Moreover, 5714 g of a 28% aqueous solution of potassium silicate manufactured by Wako pure Chemical Industries, Ltd. $((K_2O)_x (SiO_2)_y,$ wherein $X'+Y'=1$ and $Y'/X'=0.26)$, 320 g of powdery sodium hypophosphite, and 55 g of a silicone-based defoaming agent were blended therewith. The mixture was charged into a concentration vessel and blended under a temperature condition of about 50° C., followed by replacement with nitrogen. The subsequent operations were conducted in the same manner as in Example 1. The evaluation results are shown in Table 2.

Comparative Example 5

This example was conducted in accordance with Example 1 of Japanese Patent No. 2741795. As a polyamide-forming component, 1600 kg of a polyamide 66-forming component (an equimolar salt of hexamethylenediamine and adipic acid) was used. With a 50% by weight aqueous solution containing the forming component were blended 828 g of acetic acid and 828 g of hexamethylenediamine as end-blocking agents. Moreover, 138 g of powdery sodium hypophosphite, 345 g of potassium bicarbonate, and 55 g of a silicone-based defoaming agent were blended therewith and the blend was charged into a concentration vessel, followed by mixing under a temperature condition of about 50° C. and replacement with nitrogen. The subsequent operations were conducted in the same manner as in Example 1. The evaluation results are shown in Table 2.

Comparative Example 6

This example was conducted in accordance with Example of JP 9-512839 T. It was conducted in the same manner as in Example 1. However, the aqueous solution of sodium hypophosphite was blended with the aqueous solution of the polyamide-forming component. Moreover, calcium acetate instead of sodium aluminate was blended with the polyamide during a step of polymerization. The amounts of sodium hypophosphite and calcium acetate to be mixed were determined so as to be 100 ppm and 500 ppm, respectively. The evaluation results are shown in Table 1.

Production Example 1

(Continuous process) As a polyamide-forming component, a 50% by weight aqueous solution of a polyamide 66-forming component (an equimolar salt of hexamethylenediamine and adipic acid) was used. The aqueous solution was injected to a concentration layer/reactor at a rate of about 3,000 kg/hr and was concentrated to a concentration of about 90%. Then, the concentrate was discharged to a flasher and the pressure was gradually lowered to atmospheric pressure. It was transferred to a next vessel and maintained under conditions of a temperature of about 280° C. and a pressure not higher than atmospheric pressure. Then, the polyamide was extruded to form a strand, which was then cooled and cut into pellets, whereby a polyamide composition was obtained. In the continuous process polymerization, an aqueous solution of sodium hypophosphite and an aqueous solution of sodium aluminate were blended with the aqueous solution of the polyamide-forming component. The amounts of sodium hypophosphite and sodium aluminate to be mixed were determined so as to be 41 ppm and 81 ppm relative to the polyamide-forming component, respectively. The relative viscosity (RV) of the resulting polyamide composition was found to be 48. Moreover, a water content measured by the Karl Fischer's method was found to be 0.30% by weight.

Production Example 2

(Continuous process) This example was conducted in the same manner as in Example 1. However, the aqueous solution of sodium aluminate was not blended. As a polyamide-forming component, a 50% by weight aqueous solution of a polyamide 66-forming component (an equimolar salt of hexamethylenediamine and adipic acid) was used. The aqueous solution was injected to a concentration layer/reactor at a rate of about 3,000 kg/hr and was concentrated to a concentration of about 90%. Then, the concentrate was discharged to a flasher and the pressure was gradually lowered to atmospheric pressure. It was transferred to a next vessel and maintained under conditions of a temperature of about 280° C. and a pressure not higher than atmospheric pressure. Then, the polyamide was extruded to form a strand, which was then cooled and cut into pellets, whereby a polyamide composition was obtained. In the continuous process polymerization, only the aqueous solution of sodium hypophosphite was blended with the aqueous solution of the polyamide-forming component. The amounts of sodium hypophosphite to be mixed were determined so as to be 41 ppm relative to the polyamide-forming component. The relative viscosity (RV) of the resulting polyamide composition was found to be 48. Moreover, a water content measured by the Karl Fischer's method was found to be 0.30% by weight.

Example 8

The pellets obtained in Production Example 1 were charged into a solid-phase polymerization apparatus, which was then thoroughly replaced with nitrogen. Thereafter, a heater temperature was set at 220° C. utilizing a steam line and solid-phase polymerization was conducted while nitrogen was passed through. At that time, the inner temperature was within the range of 190 to 200° C. and the heating was stopped after about 10 hours. After cooling, the pellets were taken out. The relative viscosity (RV) of the resulting polyamide composition was found to be 130. A water content measured by the Karl Fischer's method was found to be 0.05% by weight. The evaluation results are shown in Table 3.

Comparative Example 7

The pellets obtained in Production Example 1 were charged into a solid-phase polymerization apparatus, which was then thoroughly replaced with nitrogen. Thereafter, a heater temperature was set at 220° C. utilizing a steam line and solid-phase polymerization was conducted while nitrogen was passed through. At that time, the inner temperature was within the range of 190 to 200° C. and the heating was stopped after about 10 hours. After cooling, the pellets were taken out. The relative viscosity (RV) of the resulting polyamide composition was found to be 130. A water content measured by the Karl Fischer's method was found to be 0.05% by weight. The evaluation results are shown in Table 3.

Example 9

Sodium aluminate $((Na_2O)_x(Al_2O_3)_y,$ (X+Y=1 and Y/X=0.81)) was blended with the pellets obtained in Comparative Example 2 so as to be 200 ppm. Using a twin-screw extruder (manufactured by Research Laboratory of Plastics Technology Co., Ltd., co-rotating twin-screw type, L/D=60 (D=30 mm)), the blend was extruded at a screw rotation number of 100 rpm, a cylinder temperature of 280° C. (a polymer temperature was 285° C. in the vicinity of a tip nozzle), a rate of 3 kg/hr (residence time of 3 minutes) while the pressure was reduced to 50 torr by means of a vacuum pump. The polymer was discharged from the tip nozzle in the form of a strand and the strand was then cooled and cut into pellets. The pellets were dried under a nitrogen atmosphere at 80° C. The evaluation results are shown in Table 3.

Example 10

Powdery sodium hypophosphite and powdery sodium aluminate $((Na_2O)_x(Al_2O_3)_y,$ (X+Y=1 and Y/X=0.81)) were blended with the pellets obtained in Comparative Example 1 so as to be 500 ppm and 1000 ppm, respectively. Using a twin-screw extruder (manufactured by Research Laboratory of Plastics Technology Co., Ltd., co-rotating twin-screw type, L/D=60 (D=30 mm)), the blend was extruded at a screw rotation number of 100 rpm, a cylinder temperature of 280° C. (a polymer temperature was 285° C. in the vicinity of a tip nozzle), a rate of 3 kg/hr (residence time of 3 minutes) while the pressure was reduced to 50 torr by means of a vacuum pump. The polymer was discharged from the tip nozzle in the form of a strand and the strand was then cooled and cut into pellets. The pellets were dried under a nitrogen atmosphere at 80° C. The evaluation results are shown in Table 3.

Comparative Example 8

Sodium aluminate $((Na_2O)_x(Al_2O_3)_y,$ (X+Y=1 and Y/X=0.81)) was blended with the pellets obtained in Comparative Example 1 so as to be 1000 ppm. Using a twin-screw extruder (manufactured by Research Laboratory of Plastics Technology Co., Ltd., co-rotating twin-screw type, L/D=60 (D=30 mm)), the blend was extruded at a screw rotation number of 100 rpm, a cylinder temperature of 280° C. (a polymer temperature was 285° C. in the vicinity of a tip nozzle), a rate of 3 kg/hr (residence time of 3 minutes) while the pressure was reduced to 50 torr by means of a vacuum pump. The polymer was discharged from the tip nozzle in the form of a strand and the strand was then cooled and cut into pellets. The pellets were dried under a nitrogen atmosphere at 80° C. The evaluation results are shown in Table 3.

Comparative Example 9

Powdery sodium hypophosphite was blended with the pellets obtained in Comparative Example 1 so as to be 500 ppm. Using a twin-screw extruder (manufactured by Research Laboratory of Plastics Technology Co., Ltd., co-rotating twin-screw type, L/D=60 (D=30 mm)), the blend was extruded at a screw rotation number of 100 rpm, a cylinder temperature of 280° C. (a polymer temperature was 285° C. in the vicinity of a tip nozzle), a rate of 3 kg/hr (residence time of 3 minutes) while the pressure was reduced to 50 torr by means of a vacuum pump, but increase of torque rapidly occurred and hence extrusion could not be conducted.

Example 11

(Continuous process) As a polyamide-forming component, a 50% by weight aqueous solution of a polyamide 66-forming component (an equimolar salt of hexamethylenediamine and adipic acid) was used. The aqueous solution was injected to a concentration layer/reactor at a rate of about 3,000 kg/hr and was concentrated to a concentration of about 90%. Then, the concentrate was discharged to a flasher and the pressure was gradually lowered to atmospheric pressure. It was transferred to a next vessel and maintained under conditions of a temperature of about 280° C. and a pressure not higher than atmospheric pressure. Then, the polyamide was extruded to form a strand, which was then cooled and cut into pellets, whereby a polyamide composition was obtained. In the continuous process polymerization, an aqueous solution of sodium hypophosphite and an aqueous solution of sodium aluminate $((Na_2O)_x(Al_2O_3)_y, (X+Y=1$ and $Y/X=0.59))$ were blended with the aqueous solution of the polyamide-forming component. The amounts of sodium hypophosphite and sodium aluminate to be mixed were determined so as to be 116 ppm and 232 ppm relative to the polyamide-forming component, respectively. Moreover, 0.25 parts by weight of melted N-stearylercamide was blended with 100 parts by weight of the polyamide composition during a step of polymerization. The relative viscosity (RV) of the resulting polyamide composition was found to be 50. Furthermore, a water content measured by the Karl Fischer's method was found to be 0.10% by weight. The evaluation results are shown in Table 4.

Example 12

This example was conducted in the same manner as in Example 11. However, a 3/1 mixture (weight ratio) of N-stearylercamide/aluminum distearate was used instead of N-stearylercamide. The evaluation results are shown in Table 4.

Example 13

This example was conducted in the same manner as in Example 11. However, a 1/1/1 mixture (weight ratio) of calcium stearate/ercamide/stearyl stearate was used instead of N-stearylercamide. The evaluation results are shown in Table 4.

Example 14

Relative to 100 parts by weight of the polyamide composition obtained in Example 11, 0.10 part by weight of N-stearylercamide was further coated onto the pellet surface. The coating was conducted using an apparatus where a device for spraying the additive in a melted state was provided onto a continuous mixer through a rotating mixing plate (a flow jet mixer manufactured by Funken Powtechs, Inc.). The evaluation results are shown in Table 4.

Example 15

Relative to 100 parts by weight of the polyamide composition obtained in Example 11, 0.08 part by weight of a 3/1 mixture (weight ratio) of N-stearylercamide/aluminum distearate was further coated onto the pellet surface. The coating was conducted using an apparatus where a device for spraying the additive in a melted state was provided onto a horizontal chamber-type mixer equipped with spade-shape shovel blades (Proshare mixer (continuous manner) manufactured by Pacific Machinery & Engineering Co., Ltd.). The evaluation results are shown in Table 4.

Comparative Example 10

This example was conducted in the same manner as in Example 11. However, the aqueous solution of sodium aluminate was not blended. The evaluation results are shown in Table 4.

TABLE 1

|  | Unit | Example 1 | Example 2 | Example 3 | Example 4 |
|---|---|---|---|---|---|
| Characteristics of polyamide |  |  |  |  |  |
| a) Polyamide |  | Ny66 | Ny66 | Ny66 | Ny66 |
| b) Phosphorus compound |  | $NaH_2PO_2$ | $NaH_2PO_2$ | $NaH_2PO_2$ | $NaH_2PO_2$ |
| c) Metal aluminate (Y/X) |  | Na aluminate (0.59) | Na aluminate (0.59) | Na aluminate (0.81) | Na aluminate (0.81) |
| d) Other compound | — | — | — | — | — |
| Content of phosphorus (P) | $mol/10^6$ g-polyamide | 1.14 | 2.28 | 1.14 | 1.14 |
| Polyvalent metal Kind |  | Al | Al | Al | Al |
| Content (Z) |  | 1.91 | 3.82 | 2.24 | 4.48 |
| Monovalent metal Kind |  | Na | Na | Na | Na |
| Content |  | 4.39 | 8.78 | 3.88 | 6.62 |
| Polyvalent metal/monovalent metal |  | 0.44 | 0.44 | 0.58 | 0.68 |
| (Polyvalent metal + monovalent metal)/P |  | 5.53 | 5.53 | 5.37 | 9.74 |
| PV (pellet) |  | 48 | 48 | 49 | 45 |
| Water content | % by weight | 0.10 | 0.10 | 0.10 | 0.10 |
| Yellowness of pellet | b value | −3.0 | −3.2 | −2.8 | −3.0 |
| PV (molded article) |  | 41 | 40 | 41 | 39 |
| ΔRV |  | −7 | −8 | −8 | −7 |
| Tensile strength (thickness 2 mm) | Mpa | 82 | 83 | 83 | 85 |
| Tensile elongation (thickness 2 mm) | % | 100 | 90 | 90 | 80 |
| Thermal aging characteristic | Day | 25 | 22 | 25 | 21 |
| Yellowness after thermal aging | b value | −1.0 | −1.3 | −0.8 | −1.0 |
| Generation of thermally decomposed product (MD) during molding | visually | A | A | A | A |
| Amount of gaseous components by thermal decomposition | % by weight | 1.5 | 1.7 | 1.5 | 1.9 |

|  | Unit | Example 5 | Example 6 | Example 7 |
|---|---|---|---|---|
| Characteristics of polyamide |  |  |  |  |
| a) Polyamide |  | Ny66 | Ny66 | Ny66 |
| b) Phosphorus compound |  | $NaH_2PO_2$ | $NaH_2PO_2$ | $NaH_2PO_2$ |
| c) Metal aluminate (Y/X) |  | Na aluminate (0.59) | Na aluminate (0.59) | Na aluminate (0.59) |
| d) Other compound |  | — | — | — |

TABLE 1-continued

| | | | | |
|---|---|---|---|---|
| Content of phosphorus (P) | mol/10⁶ g-polyamide | 1.14 | 0.40 | 0.40 |
| Polyvalent metal Kind | | Al | Al | Al |
| Content (Z) | | 0.57 | 0.67 | 0.67 |
| Monovalent metal Kind | | Na | Na | Na |
| Content | | 1.83 | 1.54 | 1.54 |
| Polyvalent metal/monovalent metal | | 0.31 | 0.44 | 0.44 |
| (Polyvalent metal + monovalent metal)/P | | 2.11 | 5.53 | 5.53 |
| PV (pellet) | | 51 | 50 | 50 |
| Water content | % by weight | 0.10 | 0.10 | 0.10 |
| Yellowness of pellet | b value | −2.7 | −2.5 | −2.6 |
| PV (molded article) | | 41 | 41 | 42 |
| ΔRV | | −10 | −9 | −8 |
| Tensile strength (thickness 2 mm) | Mpa | 82 | 81 | 81 |
| Tensile elongation (thickness 2 mm) | % | 80 | 90 | 90 |
| Thermal aging characteristic | Day | 20 | 22 | 24 |
| Yellowness after thermal aging | b value | −0.5 | −0.5 | −0.7 |
| Generation of thermally decomposed product (MD) during molding | visually | B | A | A |
| Amount of gaseous components by thermal decomposition | % by weight | 2.0 | 1.8 | 1.8 |

TABLE 2

| | Unit | Comparative Example 1 | Comparative Example 2 | Comparative Example 3 | Comparative Example 4 | Comparative Example 5 | Comparative Example 6 |
|---|---|---|---|---|---|---|---|
| Characteristics of polyamide | | | | | | | |
| a) Polyamide | | Ny66 | Ny66 | Ny66 | Ny66 | Ny66 | Ny66 |
| b) Phosphorus compound | | — | NaH₂PO₂ | — | NaH₂PO₂ | NaH₂PO₂ | NaH₂PO₂ |
| c) Metal aluminate (Y/X) | | — | — | Na aluminate (0.10) | — | — | — |
| d) Other compound | | — | — | — | potassium silicate | potassium bicarbonate | calcium acetate |
| Content of phosphorus (P) | mol/10⁶ g-polyamide | | 1.14 | — | 3.14 | 1.14 | 1.14 |
| Polyvalent metal Kind | | — | — | Al | Si | — | Ca |
| Content (Z) | | | | 12.2 | 3.87 | | 3.16 |
| Monovalent metal Kind | | | Na | Na | Na, K | Na, K | Na |
| Content | | | 1.14 | 12.2 | 32.2 | 3.64 | 1.14 |
| Polyvalent metal/monovalent metal | | — | 0.0 | 1.0 | 0.12 | 0.0 | 2.77 |
| (Polyvalent metal + monovalent metal)/P | | — | 1.0 | — | 11.5 | 3.2 | 3.43 |
| PV (pellet) | | 45 | 55 | 38 | 35 | 50 | 50 |
| Water content | % by weight | 0.10 | 0.10 | 0.10 | 0.10 | 0.10 | 0.10 |
| Yellowness of pellet | b value | −0.5 | −1.8 | −2.0 | −3.0 | −2.0 | −2.0 |
| PV (molded article) | | 35 | 35 | 30 | 30 | 40 | 35 |
| ΔRV | | −10 | −20 | −8 | −5 | −10 | −15 |
| Tensile strength (thickness 2 mm) | Mpa | 82 | 82 | 84 | 85 | 83 | 83 |
| Tensile elongation (thickness 2 mm) | % | 65 | 70 | 55 | 50 | 85 | 50 |
| Thermal aging characteristic | Day | 10 | 20 | 8 | 15 | 20 | 20 |
| Yellowness after thermal aging | b value | 5.0 | 0.5 | 0.0 | −1.0 | −0.5 | −0.5 |
| Generation of thermally decomposed product (MD) during molding | visually | B | C | B | B | B | B |
| Amount of gaseous components by thermal decomposition | % by weight | 2.2 | 2.7 | 2.2 | 2.0 | 2.0 | 2.0 |

TABLE 3

| | Unit | Example 8 | Comparative Example 7 | Example 9 | Example 10 | Comparative Example 8 |
|---|---|---|---|---|---|---|
| Characteristics of polyamide | | | | | | |
| a) Polyamide | | Ny66 | Ny66 | Ny66 | Ny66 | Ny66 |
| b) Phosphorus compound | | NaH₂PO₂ | NaH₂PO₂ | NaH₂PO₂ | NaH₂PO₂ | — |
| c) Metal aluminate (Y/X) | | Na aluminate (0.59) | — | Na aluminate (0.81) | Na aluminate (0.81) | Na aluminate (0.81) |
| d) Other compound | | — | — | — | — | — |
| Content of phosphorus (P) | mol/10⁶ g-polyamide | 0.40 | 1.14 | 1.14 | 5.68 | — |
| Polyvalent metal Kind | | Al | — | Al | Al | Al |
| Content (Z) | | 0.67 | | 2.24 | 11.3 | 11.3 |
| Monovalent metal Kind | | Na | Na | Na | Na | Na |
| Content | | 1.54 | 1.14 | 3.88 | 19.5 | 13.8 |
| Polyvalent metal/monovalent metal | | 0.44 | 0.0 | 0.58 | 0.58 | 1.22 |

TABLE 3-continued

|  | Unit | Example 8 | Comparative Example 7 | Example 9 | Example 10 | Comparative Example 8 |
|---|---|---|---|---|---|---|
| (Polyvalent metal + monovalent metal)/P |  | 5.53 | 1.0 | 5.37 | 5.42 | — |
| PV (pellet) |  | 130 | 130 | 43 | 42 | 36 |
| Water content | % by weight | 0.05 | 0.05 | 0.10 | 0.10 | 0.10 |
| Yellowness of pellet | b value | −2.5 | −1.5 | −1.0 | −1.5 | −1.0 |
| PV (molded article) |  | 87 | 75 | 35 | 35 | 26 |
| ΔRV |  | −43 | −55 | −8 | −7 | −10 |
| Tensile strength (thickness 2 mm) | Mpa | 82 | 82 | 84 | 85 | 85 |
| Tensile elongation (thickness 2 mm) | % | >200 | >200 | 60 | 50 | 30 |
| Thermal aging characteristic | Day | 40 | 35 | 20 | 17 | 7 |
| Yellowness after thermal aging | b value | −0.5 | 1.5 | 1.0 | 1.5 | 2.5 |
| Generation of thermally decomposed product (MD) during molding | visually | A | C | B | B | C |
| Amount of gaseous components by thermal decomposition | % by weight | 1.8 | 3.0 | 2.0 | 2.0 | 2.5 |

TABLE 4

|  | Unit | Example 11 | Example 12 | Example 13 | Example 14 | Example 15 | Comparative Example 10 |
|---|---|---|---|---|---|---|---|
| Characteristics of polyamide |  |  |  |  |  |  |  |
| a) Polyamide |  | Ny66 | Ny66 | Ny66 | Ny66 | Ny66 | Ny66 |
| b) Phosphorus compound |  | $NaH_2PO_2$ | $NaH_2PO_2$ | $NaH_2PO_2$ | $NaH_2PO_2$ | $NaH_2PO_2$ | $NaH_2PO_2$ |
| c) Metal aluminate (Y/X) |  | Na aluminate (0.59) | Na aluminate (0.59) | Na aluminate (0.59) | Na aluminate (0.59) | Na aluminate (0.59) | — |
| Content of phosphorus (P) | mol/$10^6$ g-polyamide | 1.14 | 1.14 | 1.14 | 1.14 | 1.14 | 1.14 |
| Polyvalent metal Kind |  | Al | Al | Al | Al | Al | — |
| Content (Z) |  | 1.91 | 1.91 | 1.91 | 1.91 | 1.91 |  |
| Monovalent metal Kind |  | Na | Na | Na | Na | Na | Na |
| Content |  | 4.39 | 4.39 | 4.39 | 4.39 | 4.39 | 1.14 |
| Polyvalent metal/monovalent metal |  | 0.44 | 0.44 | 0.44 | 0.4 | 0.44 | 0.0 |
| (Polyvalent metal + monovalent metal)/P |  | 5.53 | 5.53 | 5.53 | 5.53 | 5.53 | 1.0 |
| PV (pellet) |  | 50 | 50 | 50 | 50 | 50 | 50 |
| Water content | % by weight | 0.10 | 0.10 | 0.10 | 0.10 | 0.10 | 0.10 |
| Yellowness of pellet | b value | −3.0 | −3.0 | −2.5 | −3.0 | −3.0 | −1.5 |
| PV (molded article) |  | 40 | 39 | 37 | 38 | 37 | 35 |
| ΔRV |  | −10 | −11 | −13 | −12 | −13 | −15 |
| Mold-releasing power | Kgf | 150 | 140 | 160 | 125 | 110 | 200 |
| Plasticity | sec | 5.0 | 5.0 | 5.5 | 4.5 | 4.3 | 6.5 |
| Tensile strength (thickness 2 mm) | Mpa | 82 | 82 | 82 | 82 | 82 | 82 |
| Tensile elongation (thickness 2 mm) | % | 75 | 70 | 60 | 65 | 60 | 40 |
| Thermal aging characteristic | Day | 20 | 18 | 18 | 17 | 17 | 15 |
| Yellowness after thermal aging | b value | −0.5 | −0.5 | 0.0 | −0.5 | −0.5 | 1.0 |
| Generation of thermally decomposed product (MD) during molding | visually | B | B | B | B | B | C |
| Amount of gaseous components by thermal decomposition | % by weight | 2.0 | 2.0 | 2.2 | 2.3 | 2.4 | 3.0 |

While the invention has been described in detail and with reference to specific examples thereof, it will be apparent to one skilled in the art that various changes and modifications can be made therein without departing from the spirit and scope thereof.

INDUSTRIAL APPLICABILITY

The present invention provides a polyamide composition which, even after a prolonged heat history or repeated heat histories, is inhibited from increasing in yellowness, is inhibited from suffering thermal decomposition, has a stable melt viscosity, and is excellent in mechanical properties such as toughness as well as a process for producing the same. Thus, it is suitably utilized in various molding applications such as automobile parts, industrial parts, electric/electronic parts, and gears and extrusion applications such as tubes, rods, filaments, films, and blow molded articles.

The invention claimed is:

1. A polyamide composition comprising (a) a polyamide, (b) at least one phosphorus compound selected from the group consisting of phosphoric acids, phosphorous acids, hypophosphorous acids, metal phosphates, metal phosphites, metal hypophosphites, phosphoric esters, and phosphorous esters, and (c) a soluble metal aluminate represented by the general formula $(M_2O)_x(Al_2O_3)_y$ (wherein X+Y=1 and M is a Group 1 metal of the Periodic Table), wherein
   the value of Y/X is 0.35≦Y/X<1.0; and
   the molar ratio of polyvalent metal to monovalent metal in the composition (polyvalent metal/monovalent metal) is from 0.25 to 1.0.

2. The polyamide composition according to claim 1, wherein the phosphorus compound (b) is at least one compound selected from salts of phosphoric acid, phosphorous acid or hypophosphorous acid with Group 1 metals of the Periodic Table.

3. The polyamide composition according to claim 1, wherein the soluble metal aluminate (c) is a sodium aluminate represented by the general formula $(Na_2O)_x(Al_2O_3)_y$ (wherein X+Y=1 and $0.35 \leq Y/X < 1.0$).

4. The polyamide composition according to any one of claims 1 to 3, wherein the polyamide composition contains 0.10 to 10 mol of phosphorus element, 0.10 to 10 mol of the polyvalent metal, and 0.10 to 10 mol of the monovalent metal per 1,000,000 g of polyamide.

5. A process for producing a polyamide composition comprising a step of blending (a) at least one of a polyamide-forming component, a polyamide during a step of polymerization, and a melted polyamide with (b) at least one phosphorus compound selected from the group consisting of phosphoric acids, phosphorous acids, hypophosphorous acids, metal phosphates, metal phosphites, metal hypophosphites, phosphoric esters, and phosphorous esters and (c) a soluble metal aluminate represented by the general formula $(M_2O)_x(Al_2O_3)_y$ (wherein X+Y=1 and M is a Group 1 metal of the Periodic Table), wherein the value of Y/X is $0.35 \leq Y/X < 1.0$; and the components (b) and (c) are blended so that the molar ratio of polyvalent metal to monovalent metal (polyvalent metal/monovalent metal) becomes from 0.25 to 1.0.

6. The process for producing the polyamide composition according to claim 5, wherein both of the phosphorus compound (b) and the soluble metal aluminate (c) are mixed with the polyamide-forming components and then polymerization is conducted.

7. The process for producing the polyamide composition according to claim 5, wherein the phosphorus compound (b) is blended with the polyamide-forming component, followed by conducting polymerization, and (c) the soluble metal aluminate is blended with the polyamide during the step of polymerization.

8. The process for producing the polyamide composition according to claim 5, wherein the soluble metal aluminate (c) is dissolved in water and then blended in the form of an aqueous solution having a pH exceeding 9.

9. The process for producing the polyamide composition according to claim 5, wherein the phosphorus compound (b) is at least one compound selected from salts of phosphorous acid or hypophosphorous acid with Group 1 metals of the Periodic Table.

10. The process for producing the polyamide composition according to claim 5, wherein the soluble metal aluminate (c) is sodium aluminate represented by the general formula $(Na_2O)_x(Al_2O_3)_y$ (wherein X+Y=1 and $0.35 \leq Y/X < 1.0$).

11. The process for producing the polyamide composition according to claim 5, wherein the phosphorus compound (b) and the soluble metal aluminate (c) are blended so that 0.10 to 10 mol of phosphorus element, 0.10 to 10 mol of polyvalent metal, and 0.10 to 10 mol of monovalent metal per 1,000,000 g of polyamide are contained.

12. The process for producing the polyamide composition according to claim 5 or 10, wherein the relationship with a molar mixing amount (Z') of the soluble metal aluminate per 1,000,000 g of polyamide is $Z' < 1.785/(X-Y)$.

13. The process for producing the polyamide composition according to claim 5 or 10, wherein the relationship with a molar mixing amount (Z') of the soluble metal aluminate per 1,000,000 g of polyamide is $Z' < 1.785/X$.

14. A polyamide composition comprising 100 parts by weight of the polyamide composition according to claim 1, and 0.001 to 1 part by weight of at least one moldability improving agent selected from C18 to C22 fatty acids, metal salts of C18 to C22 fatty acids, C18 to C22 fatty acid amides, and C18 to C22 fatty acid esters.

* * * * *